United States Patent

Hatano et al.

[15] 3,707,622

[45] Dec. 26, 1972

[54] DIGITAL SERIAL ARITHMETIC UNIT

[72] Inventors: Isao Hatano; Akira Nagano; Kenzi Yosimoto, all of Kyoto, Japan

[73] Assignee: Omron Tateisi Electronics Co., Kyoto-fu, Japan

[22] Filed: Dec. 14, 1970

[21] Appl. No.: 97,883

[30] Foreign Application Priority Data

Dec. 15, 1969 Japan ..............................44/101159

[52] U.S. Cl. ..................................................235/176
[51] Int. Cl. ..................................................G06f 7/50
[58] Field of Search ...............235/176, 159, 165, 167

[56] References Cited

UNITED STATES PATENTS

| | | | |
|---|---|---|---|
| 3,564,222 | 2/1971 | DiPaola et al. | 235/152 |
| 3,059,851 | 10/1962 | Robinson | 235/165 |
| 3,249,745 | 5/1966 | Burkhart | 235/165 |
| 3,551,663 | 12/1970 | Herron et al. | 235/159 |
| 3,564,226 | 2/1971 | Seligman | 235/164 |

*Primary Examiner*—Eugene G. Botz
*Assistant Examiner*—David H. Malzahn
*Attorney*—Craig and Antonelli

[57] ABSTRACT

An electronic system for use in calculating machines comprises a plurality of serial shift registers, an appropriate number of gates and a single serial full adder. This electronic system is adapted to perform the essential arithmetic operations in the calculator in a simple manner without necessitating a large number of components.

10 Claims, 8 Drawing Figures

INVENTORS
ISAO HATANO, AKIRO NAGANO & KENZI YOSIMOTO
BY Craig, Antonelli, Stewart & Hill
ATTORNEYS INVENTORS
ISAO HATANO, AKIRO NAGANO & KENZI YOSIMOTO
BY Craig, Antonelli, Stewart & Hill
ATTORNEYS INVENTORS
ISAO HATANO, AKIRO NAGANO & KENZI YOSIMOTO
BY Craig, Antonelli, Stewart & Hill
ATTORNEYS

FIG.5(b)

| TIMING \ SHIFT REG. | 1 | 2 |
|---|---|---|
| $\tau_A$ | X | |
| $\tau_B$ | Y | X |

FIG. 4(a)

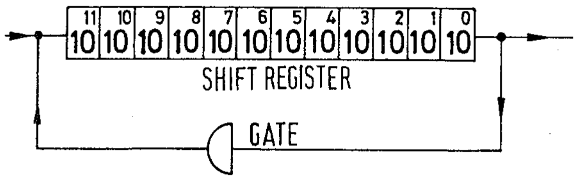

FIG. 4(b)

| | TIMING \ STAGE | $10^{11}$ | $10^{10}$ | $10^9$ | $10^8$ | $10^7$ | $10^6$ | $10^5$ | $10^4$ | $10^3$ | $10^2$ | $10^1$ | $10^0$ |
|---|---|---|---|---|---|---|---|---|---|---|---|---|---|
| $\tau$ | T1 | $\beta_{12}$ | $\beta_{11}$ | $\beta_{10}$ | $\beta_9$ | $\beta_8$ | $\beta_7$ | $\beta_6$ | $\beta_5$ | $\beta_4$ | $\beta_3$ | $\beta_2$ | $\beta_1$ |
| | T2 | $\beta_1$ | $\beta_{12}$ | $\beta_{11}$ | $\beta_{10}$ | $\beta_9$ | $\beta_8$ | $\beta_7$ | $\beta_6$ | $\beta_5$ | $\beta_4$ | $\beta_3$ | $\beta_2$ |
| | T3 | $\beta_2$ | $\beta_1$ | $\beta_{12}$ | $\beta_{11}$ | $\beta_{10}$ | $\beta_9$ | $\beta_8$ | $\beta_7$ | $\beta_6$ | $\beta_5$ | $\beta_4$ | $\beta_3$ |
| | ⋮ | ⋮ | ⋮ | ⋮ | ⋮ | ⋮ | ⋮ | ⋮ | ⋮ | ⋮ | ⋮ | ⋮ | ⋮ |
| | T10 | $\beta_9$ | $\beta_8$ | $\beta_7$ | $\beta_6$ | $\beta_5$ | $\beta_4$ | $\beta_3$ | $\beta_2$ | $\beta_1$ | $\beta_{12}$ | $\beta_{11}$ | $\beta_{10}$ |
| | T11 | $\beta_{10}$ | $\beta_9$ | $\beta_8$ | $\beta_7$ | $\beta_6$ | $\beta_5$ | $\beta_4$ | $\beta_3$ | $\beta_2$ | $\beta_1$ | $\beta_{12}$ | $\beta_{11}$ |
| | T12 | $\beta_{11}$ | $\beta_{10}$ | $\beta_9$ | $\beta_8$ | $\beta_7$ | $\beta_6$ | $\beta_5$ | $\beta_4$ | $\beta_3$ | $\beta_2$ | $\beta_1$ | $\beta_{12}$ |
| | T1 | $\beta_{12}$ | $\beta_{11}$ | $\beta_{10}$ | $\beta_9$ | $\beta_8$ | $\beta_7$ | $\beta_6$ | $\beta_5$ | $\beta_4$ | $\beta_3$ | $\beta_2$ | $\beta_1$ |

INVENTORS
ISAO HATANO, AKIRO NAGANO & KENZI YOSIMOTO
BY Craig, Antonelli, Stewart & Hill
ATTORNEYS

DIGITAL SERIAL ARITHMETIC UNIT

The present invention relates to an electronic system utilizing serial registers for use in calculating machines.

According to the present invention, there is provided an electronic system that is particularly suited for use in a compact, desk top type of electronic calculator, the system representing a simplified electronic system comprising a plurality of serial registers, an appropriate number of gates and a full adder. The invention is more specifically defined in the appended claims.

An example of the present invention will now be fully described with reference to the attached drawings, in which.

Figure 3A:
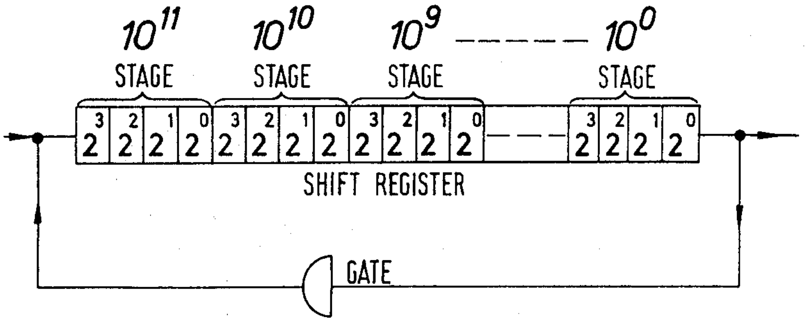
Figure 3B:
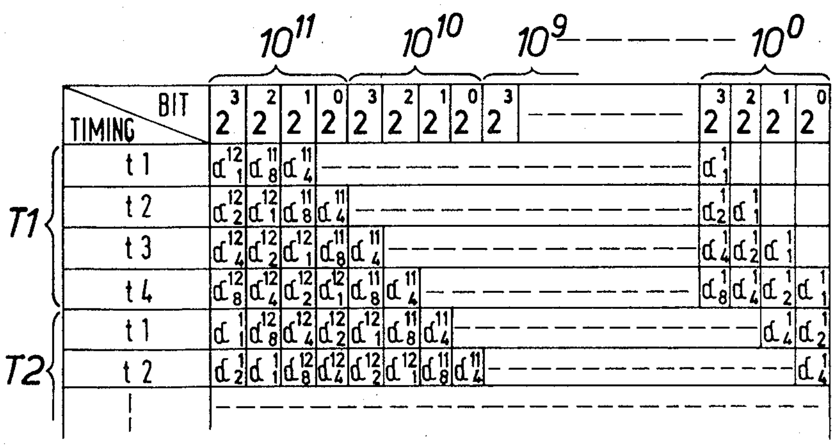
Figure 5A:
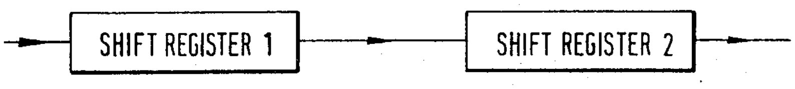

FIG. 3(*a*) and 3(*b*) show arrangements of bits in a shift register in a preferred embodiment of the present invention, wherein FIG. 3(*a*) is a schematic diagram showing each stage composed of four bits and FIG. 3(*b*) is a schematic diagram showing a manner in which each bit is shifted to the right;

FIG. 4(*a*) and 4(*b*) show stage arrangements of the shift register in the preferred embodiment, wherein FIG. 4(*a*) is a schematic diagram showing the shift register composed of 12 stages and FIG. 4(*b*) is a schematic diagram showing a manner in which each decimal digit is shifted from one stage to another; and FIGS. 5(*a*) and (*b*) are schematic diagrams showing the manner in which one index signal is shifted in the index register by a train of shift pulses.

Figure 1:
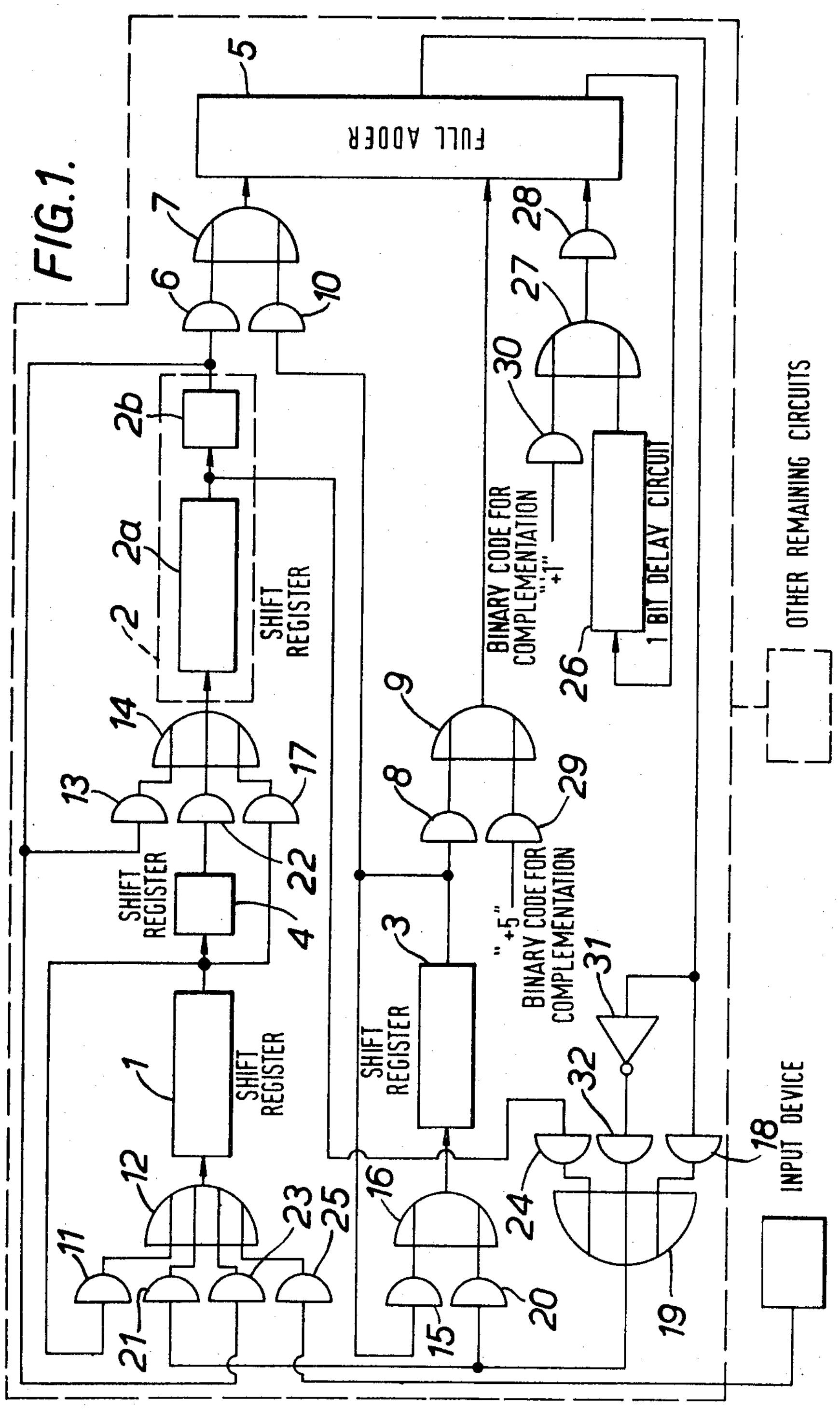
FIG. 1 is a schematic logic circuit diagram of an electronic system according to one form of the present invention.

The system shown in FIG. 1 takes the form of dynamic binary circuitry wherein a train of pulses to be stored is transferred from one stage to another in accordance with shift pulses, to be circulated around a circulation path. This type of dynamic circuitry is well known in the art and, therefore, details thereof are omitted.

First and second serial shift registers 1 and 2 are connected in series, the output of the register 2 being impressed on a full adder 5 through an AND gate 6 and an OR gate 7. In parallel with the shift registers 1 and 2, a third serial shift register 3 is connected to the full adder 5 through an AND gate 8 and an OR gate 9, as well as through an AND gate 10 and OR gate 7. The contents of the register 1, i.e., the information stored in the register 1 in the form of various combinations of binary coded digits, is circulated around a circulation path through an AND gate 11 and an OR gate 12. In other words, the output of the register 1 is applied to the input of the same register 1 through the gates 11 and 12 which are respectively turned on by electric signals in a known manner. Similarly, the contents of the registers 2 and 3 are circulated around circulation paths through an AND gate 13 and an OR gate 14, and through an AND gate 15 and an OR gate 16, respectively.

To facilitate transference of the contents of the register 1 to the register 2, an AND gate 17 is connected between the register 1 and the gate 14, so that, when the gate 17 is turned on, the contents of the register 1 can be transferred to the register 2 through the gate 14.

However, to facilitate transference of the contents of the register 1 to the register 3, a series circuit including the gates 6 and 7, the full adder 5, an AND gate 18, an OR gate 19, an AND gate 20 and the gate 16 in the order specified, is disposed between the registers 2 and 3, so that, when the gates 17, 6, 18 and 20 are respectively turned on, the contents of the register 1 can be transferred to the register 2 during the duration of one transfer pulse $\tau A$, which are in turn transferred therefrom to the register 3 during the duration of another transfer pulse $\tau B$.

In order to transfer the contents of the register 3 back to the register 1, the gates 8 and 9 are arranged between the register 3 and the full adder 5 while an AND gate 21 is connected between the gates 19 and 12. In this arrangement, when the gates 8, 18 and 21 are turned on, it will be understood that the contents of the register 3 can be transferred to the register 1 through the gates 8 and 9, full adder 5, and gates 18, 19, 21 and 12.

For the convenience of simplification, it is assumed that each of the registers 1, 2 and 3 has the same number of stages, each stage being composed of four bits. By way of example, one decimal digit $\beta$ can be expressed by various combinations of four binary digits $\alpha_8$, $\alpha_4$, $\alpha_2$ and $\alpha_1$, wherein the symbol $\alpha$ represents "1" or "0" and numerals, 8, 4, 2 and 1 represent the $2^3$, $2^2$, $2^1$ and $2^0$ positions, respectively. If the number of stages of the shift register is assumed to be 12, 48 bits are provided for, the number having 12 decimal digits $\beta_{12}$, $\beta_{11}$ . . . $\beta_2$ and $\beta_1$ in sequence, wherein numerals 12 to 1 represent the $10^{11}$, $10^{10}$, $10^9$ . . . $10^1$ and $10^0$ columns, respectively. In this example, four clock pulses $t_1$, $t_2$, $t_3$ and $t_4$ are employed to shift each bit of the register to the right. For shifting one decimal digit $\beta$ from one stage of the register to another, shift pulses T1, T2, T3 and so on are employed.

The entire contents of any one of the shift registers can be transferred during the duration of a single transfer pulse $\tau A$ or $\tau B$, if 48 clock pulses are applied to the input of the register during the same duration.

For a shift to the left of the contents of the shift register 1, a fourth serial shift register 4 having four bits and an AND gate 22 are interposed between the register 1 and the gate 14, while an AND gate 23 is interposed between the register 2 and the gate 12. In this arrangement, when the gate 22 is turned on, the contents of the register 1 can be transferred to the register 2 during the duration of a single transfer pulse $\tau A$. However, since the contents of the register 1 pass through the register 4 before they reach the register 2, the highest significant digit remains in the register 4 and the contents of a given stage can thus be shifted to the left to the next adjacent stage. When the gate 23 is turned on during a subsequent transfer pulse $\tau B$, the contents of the register 2 can be transferred to the register 1 to complete the shift to the left of the contents of the register 1.

For a shift to the right of the contents of the shift register 1, the register 2 is divided into two registers; one is a fifth shift register **2*b* for storing the least significant digit and the other is a sixth shift register 2*a* for storing the binary digits other than the least significant digit. An AND gate 24 is interconnected between the output of the register 2*a* and the gate 19. In this arrangement, when the gates 24 and 21 are respectively turned on, after the contents of the register 1 have been transferred to the register 2*a*, they can be transferred back to the register 1 through the gates 24, 19, 21 and 12 in that order. However, since no least significant digit remains in the register 2a**, the contents of a given stage can be shifted right to the next adjacent stage.

In order to register specific decimal digits into the shift register 1 by operating relevant keys (not shown) disposed on the key board, it is necessary to open an ANd gate 25, which is in turn connected with the input of the gate 12, each time the keys are operated. However, since the arrangement of the system is such as hereinbefore described, it can be clearly understood that the least significant digit can always be registered at the rightmost side of the register 1 even through the keys are operated from the highest significant digit to the least significant digit.

By way of example, in the case where the number "123" is intended to be read in by the shift register, keys representative of "1," "2" and "3" are usually operated in sequence. At the time the key representative of "1" is operated, a pulse of binary digits of decimal "1" is first transmitted to the shift register 1 and circulates around the circulation path. At the time the key representative of "2" is then operated, a pulse of binary digits of decimal "2" is registered in the shift register 1, prior to the entry of the circulating pulse representative of "1" into the input of the register 1 upon completion of each circulation, so that the decimal "2" can be registered at the rightmost stage of the register. Similarly, at the time the key representative of "3" is operated, a pulse of binary digits of decimal "3" can be registered at the rightmost stage of the shift register which has been occupied by the binary digits of decimal "2" prior to the application of the pulse of decimal "3", in the same manner as the binary digits of decimal "2" is registered. Thus, it will be apparent that the decimal number "123" can be stored in the shift register.

In the case where an addition such as X+Y is to be performed in the calculator having the system of the present invention, it is merely necessary to set X in the shift register 1, which contents X of the shift register 1 can be transferred to the shift register 3. Thereafter, Y is set in the shift register 1, that had been occupied by the contents X prior to the application of a train of pulses representative of Y to the input of the shift register 1. Immediately after the equation X + Y has been applied, the contents X and Y, respectively stored in the shift registers 3 and 1, are in turn transferred to cause the contents X and Y to be stored in the shift registers 1 and 3, respectively. Then the contents X and Y are applied to the input of the full adder 5, the sum of X and Y being subsequently transferred to the shift register 1. At this time, the gates 17, 6, 8, 18 and 21 are turned on to facilitate transference of the sum of X and Y to the register 1. However, it should be noted that, if the gate 15 is also turned on, the contents Y will remain in the shift register 3.

In order to cause the adder 5 to function as a full adder, the output of the adder 5 is arranged to circulate back to the same adder 5 through a one bit delay circuit 26, an OR gate 27 and an AND gate 28.

The tens complement method known in the art is herein employed for performing the arithmetic operation of subtraction. For this purpose, the system is provided with AND gates 29, 30 and 28. The input to the gate 29 is a train of pulses which correspond to a binary code of "0101" representative of a decimal number "+5" for each digit of the specific decimal number. By way of example, if the decimal number has 12 digits, each digit is provided with shift pulse durations T1, T2 . . . T11 and T12, during each of which duration clock pulses *t*1, *t*2, *t*3 and *t*4 are employed for four bits representing one digit of the decimal number. In this arrangement, in order to apply a "+5" pulse train to each digit, it is only necessary to apply the pulses *t*1 and *t*3 representative of binary digits "0101" during each shift pulse duration T.

The input to the gate 30 is a train of pulses which are a binary code of "0001" representative of "+1" for each digit of the specific decimal number. In the example above described, the "+1" pulse train is applied during each shift pulse duration T. The gate 28 is arranged to close during the duration of the starting bit of the least significant digit so that the "+1" pulse train cannot be applied to the full adder 5 during the shift pulse duration T1.

In this arrangement, in order to obtain a complement of the contents of the shift register 3, it is necessary to open the gate 10 connected between the register 3 and the gate 7, and the gate 29, so that the output can be generated from the full adder 5. This output is then supplied to a "not" inverter 31, wherein the contents thus transferred are inverted and then returned to the register 3 while an AND gate 32 and the gate 20 are turned on.

By way of example, assume that the contents of the register 3 is 00825. This decimal number can be expressed by the following combination of binary digits:

0000 0000 1000 0010 0101 (a)

The decimal number "+5" which is to be applied to each digit of (a) through the gate 29 can be expressed by the following combination of binary digits:

0101 0101 0101 0101 0101 (b)

The decimal number "+1" to be applied through the gate 30 can be expressed by the following combination of binary digits. However, it is noted that the gate 28 acts to erase the rightmost bit of the least significant digit, when the first pulse *t*1 is applied during the duration T1. Therefore the digits are 0001 0001 0001 0001 0000 (c)

The sum of (a), (b) and (c) given by the full adder 5 is:

0110 0110 1110 1000 1010 (d)

Then, the combination (d) can be inverted through the "not" inverter 31 to give:

1001 1001 0001 0111 0101 (e)

From the combination (e), the decimal digits 99175, which are the complement of 00825, are obtained.

The arithmetic operation of multiplication or division can be performed by repeating the arithmetic operation of subtraction or addition in the calculator by means of a known method.

It should be noted that the present system can be combined with various circuits such as a power source line, a digital display unit and control circuits, in order to obtain a complete calculator. However, these other circuits are well known in the art and, therefore, details thereof have been omitted.

Figure 2:
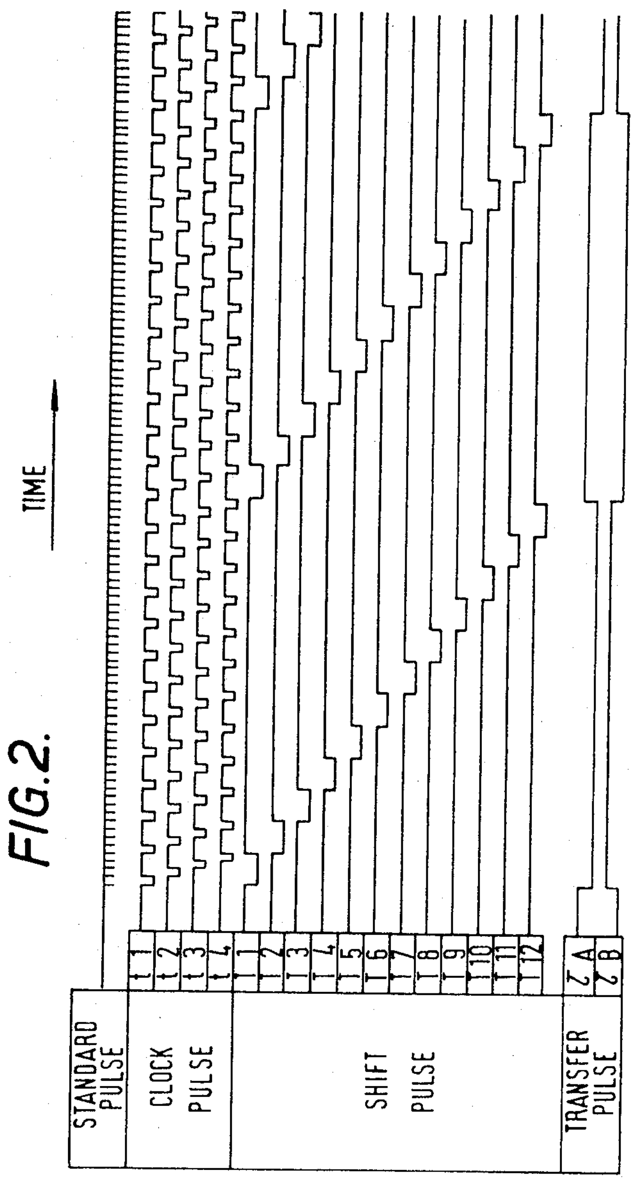
FIG. 2 is a schematic diagram of various pulses employed in the system, showing their timing with respect to one another.

FIG. 2 shows the time relationship between standard pulses, the clock pulses $t1$ to $t4$, the shift pulses T1 to T12 and the transfer pulses $\tau$A and $\tau$B.

FIG. 3($a$) shows the form taken by each of the shift registers, these being divided into 12 stages, identified as the $10^{11}$, $10^{10}$, $10^9$ down to $10^0$ stage. Each stage contains four binary digit positions $2^3$, $2^2$, $2^1$ and $2^0$. The gate shown symbolizing the recirculation procedure.

FIG. 3($b$) demonstrates how each bit is shifted to the right and recirculated by successive clock pulses $t1$ to $t4$ of successive shift pulses T1, T2 etc. For example, the bit $\alpha^{12}$ in position $2^3$ of stage $10^{11}$ at the first time $t1$ is moved by the next pulse $t2$ to the next position to the right, i.e. into position $2^2$ of stage $10^{11}$. Similarly all the other bits are simultaneously moved to the right, the bit in position $2^0$ of stage $10^0$ (i.e. bit $\alpha_1{}^1$ at pulse $t4$, T1) being recirculated to position $2^3$ of stage $10^{11}$ at the next pulse, i.e. $t1$, T2, and so on.

FIG. 4($a$) shows the stage arrangement only of each shift register, again with the gate symbolizing the recirculation. FIG. 4($b$) shows the progress of the information around the register for each shift pulse T1 to T12 of a typical transfer pulse period $\tau$, the information here being represented by the decimal digits $\beta_{12}$ to $\beta_1$.

FIG. 5($b$) shows the manner in which the contents X and Y are shifted from shift register 1 to shift register 2 (FIG. 5($a$)) by the transfer pulses $\tau$A and $\tau$B.

The embodiments of the invention in which an exclusive property or privilege is claimed are defined as follows:

1. A system for use in an electronic calculator comprising:
- first means for supplying input pulses to said system;
- a first serial shift register;
- a first gate circuit, coupled to the output of said first means, for gating the pulses generated thereby into said first serial shift register;
- a second serial shift register;
- a second gate circuit, coupled between said first and second serial shift registers, for gating the contents of said first serial shift register into said second serial shift register;
- a full adder circuit;
- a third gate circuit, coupled between said second serial shift register and a first input of said full adder circuit for gating the contents of said second serial shift register to said full adder circuit;
- a third serial shift register;
- a fourth gate circuit, coupled between said full adder circuit and said third serial shift register, for gating the output of said full adder circuit into said third serial shift register;
- a fifth gate circuit, coupled between said third serial shift register and a second input of said full adder circuit, for gating the contents of said third serial shift register to said full adder circuit;
- a sixth gate circuit, coupled between said full adder circuit and said first serial shift register, for gating the output of said full adder circuit into said first serial shift register; and
- second means, coupled to said second input and a third input of said full adder circuit, respectively, for supplying binary coded pulses representative of the decimal numbers +5 and +1 to said full adder circuit for complementation when the arithmetic operation of subtraction is to be performed.

2. A system for use in an electronic calculator comprising:
- first means for supplying input pulses to said system;
- a first serial shift register;
- a first gate circuit, coupled to the output of said first means, for gating the pulses generated thereby into said first serial shift register;
- a second serial shift register;
- a second gate circuit, coupled between said first and second serial shift registers, for gating the contents of said first serial shift register into said second serial shift register;
- a full adder circuit;
- a third gate circuit, coupled between said second serial shift register and a first input of said full adder circuit for gating the contents of said second serial shift register to said full adder circuit;
- a third serial shift register;
- a fourth gate circuit, coupled between said full adder circuit and said third serial shift register, for gating the output of said full adder circuit into said third serial shift register;
- a fifth gate circuit, coupled between said third serial shift register and a second input of said full adder circuit, for gating the contents of said third serial shift register to said full adder circuit;
- a sixth gate circuit, coupled between said full adder circuit and said first serial shift register, for gating the output of said full adder circuit into said first serial shift register; and
- second means, coupled to said second input and a third input of said full adder circuit, respectively, for supplying binary coded pulses representative of the decimal numbers +5 and +1 to said full adder circuit for complementation when the arithmetic operation of subtraction is to be performed,
- said second serial shift register comprises first and second stages connected in series, said first stage being connected to the output of said second gate circuit, the output of said second stage being connected to said third gate circuit, and further including third means, coupled to the output of said second stage of said second serial shift register, for feeding back the output of said second stage to at least one of the circuit elements consisting of said first serial shift register and said first stage of said second serial shift register.

3. A system for use in an electronic calculator comprising:
- first means for supplying input pulses to said system;
- a first serial shift register;
- a first gate circuit, coupled to the output of said first means, for gating the pulses generated thereby into said first serial shift register;
- a second serial shift register;
- a second gate circuit, coupled between said first and second serial shift registers, for gating the contents of said first serial shift register into said second serial shift register;
- a full adder circuit;
- a third gate circuit, coupled between said second serial shift register and a first input of said full adder circuit for gating the contents of said second serial shift register to said full adder circuit;
- a third serial shift register;

a fourth gate circuit, coupled between said full adder circuit and said third serial shift register, for gating the output of said full adder circuit into said third serial shift register;

a fifth gate circuit, coupled between said third serial shift register and a second input of said full adder circuit, for gating the contents of said third serial shift register to said full adder circuit;

a sixth gate circuit, coupled between said full adder circuit and said first serial shift register, for gating the output of said full adder circuit into said first serial shift register;

second means, coupled to said second input and a third input of said full adder circuit, respectively, for supplying binary coded pulses representative of the decimal numbers +5 and +1 to said full adder circuit for complementation when the arithmetic operation of subtraction is to be performed; and a fourth serial shift register connected to the output of said first serial shift register and a seventh gate circuit connected between said fourth serial shift register and said second serial shift register, for gating the contents of said fourth serial shift register into said second serial shift register.

4. A system according to claim 3, wherein each of said first, second and third serial shift registers is a gate controlled recirculating shift register.

5. A system according to claim 3, wherein said second serial shift register comprises first and second stages connected in series, said first stage being connected to the outputs of said second and seventh gate circuits, the output of said second stage being connected to said third gate circuit, and further including third means, coupled to the output of said second stage, for feeding back the output of said second stage to at least one of the circuit elements consisting of said first serial shift register and said first stage of said second serial shift register.

6. A system according to claim 5, wherein said third means comprises eighth and ninth gate circuits, respectively connected between the output of said second stage of said second serial shift register and said first serial shift register and said first stage of said second serial shift register, and further including a 10th gate circuit for feeding back the output of said third serial shift register to the input thereof.

7. A system according to claim 6, further including an 11th gate circuit, coupled between the output of said first stage of said second serial shift register and said first and third serial shift registers, for gating the contents of said first stage of said second serial shift register into said first and third serial shift registers, and further including a 12th gate circuit connected between the output of said third serial shift register and said first input of said full adder circuit, for gating the contents of said third serial shift register to said full adder circuit, in addition to said fifth gate circuit.

8. A system according to claim 7, wherein each of said first, second and third serial shift registers is a gate controlled recirculating shift register.

9. A system according to claim 7, further including a gated inverter circuit coupled between the output of said full adder and the inputs of said first and third serial shift register.

10. A system according to claim 9, further including a one bit delay circuit gated between the output of said full adder and said third input thereof.

* * * * *